United States Patent
Geri et al.

(10) Patent No.: US 11,760,913 B2
(45) Date of Patent: Sep. 19, 2023

(54) PERLITE CONTAINING DRILLING FLUIDS AND USES THEREOF

(71) Applicant: King Fahd University of Petroleum and Minerals, Dhahran (SA)

(72) Inventors: Badr Salem Ba Geri, Dhahran (SA); Abdulrauf Adebayo, Dhahran (SA); Jaber Al Jaberi, Dhahran (SA); Shirish Patil, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/442,117

(22) Filed: Jun. 14, 2019

(65) Prior Publication Data

US 2020/0392392 A1 Dec. 17, 2020

(51) Int. Cl.
*C09K 8/16* (2006.01)
*C09K 8/26* (2006.01)
*C09K 8/502* (2006.01)
*E21B 21/00* (2006.01)
*C09K 8/504* (2006.01)

(52) U.S. Cl.
CPC .............. *C09K 8/16* (2013.01); *C09K 8/265* (2013.01); *C09K 8/502* (2013.01); *C09K 8/5045* (2013.01); *E21B 21/003* (2013.01); *C09K 2208/34* (2013.01)

(58) Field of Classification Search
CPC .......... C09K 8/16; C09K 8/265; C09K 8/502; C09K 8/5045; E21B 21/003
See application file for complete search history.

(56) References Cited

U.S. PATENT DOCUMENTS

| | | | | |
|---|---|---|---|---|
| 4,421,655 A | * | 12/1983 | Cowan | C09K 8/32 507/107 |
| 4,559,149 A | * | 12/1985 | Shell | C09K 8/10 166/297 |
| 4,707,281 A | * | 11/1987 | Miller | C09K 8/206 507/110 |
| 7,350,573 B2 | | 4/2008 | Reddy | |
| 8,691,737 B2 | | 4/2014 | Chatterji et al. | |

(Continued)

FOREIGN PATENT DOCUMENTS

CN 103740341 B 1/2016

OTHER PUBLICATIONS

Erding, et al. ; A new type of cementation flushing fluid for efficiently removing wellbore filter cake ; Natural Gas Industry B 2 ; pp. 455-460 ; Feb. 15, 2016 ; 6 Pages.

(Continued)

*Primary Examiner* — Silvana C Runyan
(74) *Attorney, Agent, or Firm* — Oblon, McClelland, Maier & Neustadt, L.L.P.

(57) ABSTRACT

A drilling fluid containing a liquid phase, a weighting agent (e.g. barite, calcite, ilmenite), and perlite is described. The drilling fluid may further contain one or more additives including a defoamer, a fluid-loss control agent, a viscosifier, an antiscalant, a deflocculant, a lubricant, a clay stabilizer, a bridging agent, and a surfactant. A process of drilling a subterranean geological formation utilizing the drilling fluid is also specified. The introduction of perlite to the drilling fluid is effective in reducing the thickness and permeability of filter cakes formed during the drilling process.

10 Claims, 7 Drawing Sheets

(56) References Cited

U.S. PATENT DOCUMENTS

| | | |
|---|---|---|
| 2011/0100626 A1 | 5/2011 | Brenneis et al. |
| 2011/0214870 A1* | 9/2011 | Shaarpour .............. C09K 8/035 166/310 |
| 2015/0141304 A1 | 5/2015 | Davidson et al. |

OTHER PUBLICATIONS

Dicalite ; Perlite for Use in Well Cementing ; https://www.dicalite.com/2018/03/perlite-use-well-cementing/ ; 2018 ; 4 Pages.
Halliburton ; Perlite Cement Additive ; Mar. 11, 2019 ; 1 Page.
Oilfield Team ; Drilling Fluid Additives ; May 13, 2017 ; https://oilfieldteam.com/en/a/learning/Drilling-Fluid-Additives ; 16 Pages.

* cited by examiner

PERLITE CONTAINING DRILLING FLUIDS AND USES THEREOF

BACKGROUND OF THE INVENTION

Technical Field

The present disclosure relates to a drilling fluid composition containing a liquid phase, a weighting agent, and perlite, and a method of drilling a subterranean geological formation using the drilling fluid.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Natural resources such as gas and oil reservoirs within subsurface geological rock formations can be extracted via drilled wells. A drilling fluid mixture of mud and chemical additives is required to remove drill cuttings, control the sub-surface pressure, and minimize formation damage. In order to improve drilling efficiency and reduce formation damage caused by invasion of drilling fluid particles into the formation, drilling fluid additives are under constant development and testing following API procedures.

To counter high formation pressure, a high content of weighting material is often added to increase the density of a drilling fluid for drilling deep oil and gas wells. Weighting materials such as barite and ilmenite are commonly used because of their high specific gravity and low cost. A heavy drilling fluid can prevent an unscheduled entry of formation fluid into the well (a phenomenon a called "kick") by exerting a large hydrostatic pressure over the formation.

During deep drilling, an overbalanced drilling condition is often required where the hydrostatic pressure of the drilling fluid is higher than that of the formation being drilled. In an overbalanced drilling condition with a substantial pressure gradient, drilling fluid deposits over the face of a drilled formation. Furthermore, fine particles can invade the formation and plug rock pore throats. Plugging of the pore throats can significantly reduce the productivity of the well. Therefore, it is desirable for a drilling fluid to form a thin and impermeable filter cake that reduces the amount of drilling fluid that enters the formation. An important function of a filter cake is to provide good sealing properties that minimize permeation of the drilling fluid and solids into the formation, as well as withstand a high differential overbalance pressure.

Over the years, rigorous research has been dedicated to improve properties of drilling fluids. Additives such as polymers that enhance mud rheology, bentonite that improves hole cleaning capacity of drilling mud, and bridging agents to control formation damage have been developed. Recent advances in drilling fluid research include the use of nanoparticles to further improve the performance of drilling fluids.

The unique physico-chemical, thermal, and electrical properties of nanomaterials qualify them as suitable candidates as performance enhancing drilling mud additives. However, the use of nanoparticles is restricted because of high cost and instability at high temperature and pressure. Therefore, there is an urgent need to develop effective additives for drilling fluids used in drilling deep oil and gas wells. It is particularly desirable to develop a low-cost drilling fluid additive that: (a) helps form a thin and impermeable filter cake, (b) does not interfere with common heavy weighting agents such as barite and ilmenite, and (c) does not cause damage to the formation and the environment.

In view of the forgoing, one objective of the present disclosure is to provide a drilling fluid containing perlite and a weighting agent such as barite and calcite. A further objective of the present disclosure is to provide a method of drilling a subterranean formation using the drilling fluid. The filter cakes formed during the drilling using the disclosed drilling fluid are thinner and less porous than those formed using a drilling fluid that does not contain perlite.

BRIEF SUMMARY OF THE INVENTION

According to a first aspect, the present disclosure relates to a drilling fluid containing (i) a liquid phase which is selected from the group consisting of a water-based fluid and an oil-based fluid, (ii) a weighting agent which is at least one selected from the group consisting of barite, calcite, and ilmenite, and (iii) perlite, wherein the weighting agent is present in an amount of 20-600 lb/bbl, and the perlite is present in an amount of 0.5-12 lb/bbl.

In one embodiment, the perlite is present in an amount of 1-5 lb/bbl.

In one embodiment, the perlite is an expanded perlite.

In one embodiment, the perlite is an unmodified perlite.

In one embodiment, the perlite is in the form of particles having an average particle size of 0.1-6 mm.

In one embodiment, the weighting agent is barite, calcite, or both.

In one embodiment, the drilling fluid further comprises at least one additive selected from the group consisting of a defoamer, a fluid-loss control agent, a viscosifier, an antiscalant, a deflocculant, a lubricant, a clay stabilizer, a bridging agent, and a surfactant.

In one embodiment, the weighting agent is barite, and the drilling fluid has a yield point to plastic viscosity ratio of 1.3:1 to 2.5:1.

In one embodiment, the weighting agent is calcite, and the drilling fluid has a yield point to plastic viscosity ratio of 1.4:1 to 3:1.

In one embodiment, the weighting agent is barite, and the drilling fluid has a density of 12-25 ppg.

In one embodiment, the weighting agent is calcite, and the drilling fluid has a density of 8-15 ppg.

In one embodiment, the drilling fluid has a pH in a range of 7-12.

In one embodiment, the oil-based fluid comprises diesel oil.

According to a second aspect, the present disclosure relates to a method of drilling a subterranean geological formation. The method involves drilling the subterranean geological formation to form a wellbore therein, and circulating the drilling fluid of the first aspect into the wellbore during the drilling, wherein a filter cake containing the weighting agent is formed on a wall of the wellbore during the circulating.

In one embodiment, the wellbore has a temperature in a range of 10-200° C.

In one embodiment, the wellbore has a pressure in a range of 100-1,000 psi.

In one embodiment, a thickness of the filter cake is 30-80% less than that of a filter cake formed by a drilling method performed in a substantially similar manner with a substantially similar drilling fluid that is devoid of perlite.

In one embodiment, a porosity of the filter cake is 20-70% less than that of a filter cake formed by a drilling method performed in a substantially similar manner with a substantially similar drilling fluid that is devoid of perlite.

In one embodiment, the subterranean geological formation is a carbonate formation, or a sandstone formation.

In one embodiment, the wellbore is a vertical wellbore, a horizontal wellbore, or a multilateral wellbore.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all embodiments of the disclosure are shown.

As used herein, the words "a" and "an" and the like carry the meaning of "one or more."

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), 10% of the stated value (or range of values), or +/−15% of the stated value (or range of values). Within the description of this disclosure, where a numerical limit or range is stated, the endpoints are included unless stated otherwise. Also, all values and subranges within a numerical limit or range are specifically included as if explicitly written out.

As defined here, a drilling fluid, or "drilling mud," or "drilling fluid composition," is a specially designed fluid that is circulated in a wellbore or borehole as the wellbore is being drilled in a subterranean formation to facilitate the drilling operation. As used herein, the term "drilling operation" shall mean drilling, running casing, and/or cementing unless indicated otherwise. The various functions of a drilling fluid include cooling and lubricating the drill bit, aiding in support of the drill pipe and drill bit, removing drill cuttings from the wellbore, and providing a hydrostatic head to maintain the integrity of the wellbore walls and prevent well blowouts. Specific drilling fluids are selected to be utilized a drilling operation in accordance with the characteristics of a particular geological formation.

According to a first aspect, the present disclosure relates to a drilling fluid containing (i) a liquid phase which is selected from the group consisting of a water-based fluid and an oil-based fluid, (ii) a weighting agent which is at least one selected from the group consisting of barite, calcite, and ilmenite, and (iii) perlite.

As used herein, perlite refers to an amorphous volcanic glass with a relatively high water content, typically formed by the hydration of obsidian. An unmodified (i.e. raw, unexpanded) perlite occurs naturally and has the capability to expand when subjected to heat and form expanded perlite. Perlite softens when heated to temperatures of 800-900° C. Water trapped in the structure of perlite vaporizes, thus expanding the material to 7-16 times its original volume. An unmodified perlite is a hydrophilic material with a bulk density in a range of 500-1,400 kg/m$^3$, preferably 600-1,300 kg/m$^3$, preferably 700-1,200 kg/m$^3$, preferably 800-1,100 kg/m$^3$, preferably 900-1,000 kg/m$^3$. A typical expanded perlite has a bulk density in a range of 10-300 kg/m$^3$, preferably 15-200 kg/m$^3$, preferably 20-150 kg/m$^3$, preferably 25-100 kg/m$^3$, preferably 30-75 kg/m$^3$, preferably 40-50 kg/m$^3$. The perlite of the present disclosure may be an unmodified perlite, an expanded perlite, or mixtures thereof.

The perlite may comprise 65-80 wt % of $SiO_2$, preferably 70-75 wt % of $SiO_2$; 10-18 wt % of $Al_2O_3$, preferably 12-15 wt % of $Al_2O_3$; 2-5 wt % of $Na_2O$, preferably 3-4 wt % of $Na_2O$; and 2-6 wt % of $K_2O$, preferably 3-5 wt % of $K_2O$, with each weight percent being relative to a total weight of the perlite. In certain embodiments, the perlite may further contain various elements including, but not limited to, calcium, iron, magnesium, and oxides thereof in less than 2 wt %, preferably less than 1 wt % relative to a total weight of the perlite. In a preferred embodiment, the perlite is an expanded perlite. The perlite of the present disclosure may be capable of absorbing many times its weight of aqueous and/or non-aqueous fluids and still remains dry. Accordingly, the presence of perlite in the drilling fluid may facilitate formation of a filter cake with enhanced sealing property during drilling.

Exemplary expanded perlites include, but are not limited to, shattered fragment perlite, individual spherical cell perlite, open-surfaced expanded perlite, and smooth-surfaced expanded perlite. In addition, the perlite can be ground by any method suitable for providing a ground perlite of a desired size. In a preferred embodiment, the perlite is in the form of particles having an average particle size of 0.1-6 mm, preferably 0.15-3 mm, preferably 0.3-2 mm, preferably 0.6-1.5 mm, preferably 0.8-1.2 mm. In an embodiment, the perlite particles are non-spherical. In one embodiment, the perlite particles have a flake-shape. The flake-shaped perlite particles may form sediment type layers that may help forming an impermeable filter cake layer while drilling. In another embodiment, the perlite particles have jagged edges. Jagged edges of the perlite particles may interlock particles when at close proximity to each other, which may provide enhanced mechanical properties and sealing functionality of the filter cake by using the drilling fluid for drilling.

Vermiculite is a hydrous phyllosilicate mineral that undergoes significant expansion when heated. Vermiculite is usually of higher cost than perlite. In certain embodiments, vermiculite is used in addition to or in lieu of the perlite in the drilling fluid.

In one or more embodiments, the perlite is present in the drilling fluid in an amount of 0.5-12 lb/bbl, preferably 0.75-12 lb/bbl, preferably 1-10 lb/bbl, preferably 1.5-8 lb/bbl, preferably 2-6 lb/bbl, preferably 2.5-5 lb/bbl, preferably 3-4.5 lb/bbl, preferably 4-4.5 lb/bbl. In a most preferred embodiment, the perlite is present in the drilling fluid in an amount of 1-5 lb/bbl, 2-4 lb/bbl, or about 3 lb/bbl. As defined herein, "lb/bbl" represents pounds per barrel. 1 lb/bbl of an additive (e.g. perlite) present in a drilling fluid is equivalent to 1 pound of the additive in 1 barrel (42 US gallons) of the drilling fluid. Also, 1 lb/bbl of an additive present in a drilling fluid is equivalent to 2.85 kg of the additive in 1 m$^3$ of the drilling fluid.

Weighting agents are commonly used to increase the density of drilling fluids. Preferably, the drilling fluid of the present disclosure comprises a weighting agent, and the weighting agent may be present to produce a desired bulk density in the drilling fluid. In one or more embodiment, the weighting agent is at least one selected from the group consisting of barite, calcite, and ilmenite. Barite (or baryte) is a sulfate mineral containing barium sulfate ($BaSO_4$). Calcite is a carbonate mineral and the most stable polymorph of calcium carbonate ($CaCO_3$). Ilmenite (or manaccanite) is a titanium-iron oxide mineral with a formula $FeTiO_3$. In preferred embodiments, the weighting agent comprises barite, calcite, or both. Additional weighting agents including minerals such as hematite, magnetite, iron oxides, siderite, celestite, dolomite, olivine, magnesium oxides, halites, strontium sulfate, manganese tetraoxide and the like may be utilized in addition to or in lieu of barite, calcite, and/or ilmenite in the drilling fluid. Other weighting agents can also be envisioned by those of ordinary skill in the art.

The weighting agent may be in the form of particles having an average particle size or longest dimension in a range of 5-100 nm, preferably 10-75 nm, more preferably 20-50 nm, even more preferably 30-40 nm. However, in some embodiments, the weighting agent particles may have an average particle size of less than 10 nm. In one preferred embodiment, the weighting agent is barite in the form of particles having an average particle size of 5-100 nm, 10-75 nm, 20-50 nm, or 30-40 nm. In another preferred embodiment, the weighting agent is calcite in the form of particles having an average particle size of 5-100 nm, 10-75 nm, 20-50 nm, or 30-40 nm. In one or more embodiments, the weighting agent is present in the drilling fluid in an amount of 20-600 lb/bbl, preferably 30-550 lb/bbl, preferably 50-500 lb/bbl, preferably 75-450 lb/bbl, preferably 100-400 lb/bbl, preferably 150-350 lb/bbl, preferably 200-300 lb/bbl.

In one embodiment, the liquid phase is a water-based fluid. As used here, the term "water-based fluid" refers to any water containing solution, including saltwater, hard water, and/or fresh water. For purposes of this description, the term "saltwater" includes saltwater with a chloride ion content of between about 6000 ppm and saturation, and is intended to encompass seawater and other types of saltwater including groundwater comprising additional impurities typically found therein. The term "hard water" includes water having mineral concentrations between about 2000 mg/L and about 300,000 mg/L. The term "fresh water" includes water sources that comprise less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Exemplary salts that may be present in saltwater, hard water, and/or fresh water include, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. The water-based fluid may be supplied from a natural source, such as an aquifer, a lake, and/or an ocean, and may be filtered to remove large solids before being used in the drilling fluid. The water-based fluid may be present as the liquid phase in the drilling fluid with a weight percentage in a range of 30-80 wt %, preferably 40-70 wt %, more preferably 45-60 wt %, even more preferably 50-55 wt %, relative to a total weight of the drilling fluid. In one embodiment, the drilling fluid may be considered a water-based drilling fluid.

In another embodiment, the liquid phase is an oil-based fluid, which may comprise one or more of diesel oil, petroleum oil, fuel oil, biodiesel, biomass to liquid (BTL) fuel, gas to liquid (GTL) diesel, mineral oil, an ester, an alpha-olefin, a natural oil, and derivatives and/or combinations thereof. In a preferred embodiment, the oil-based fluid comprises diesel oil. In some embodiments, the oil-based fluid may include up to 40% by weight, preferably 1-30% by weight, preferably 5-20% by weight of an aqueous phase dispersed therein, for example, in a form of an invert emulsion. The weight percentiles are relative to a total weight of the liquid phase. In one embodiment, the drilling fluid may be considered an oil-based drilling fluid.

The term "breaker" as used herein refers to an additive of the drilling fluid that provides a desired viscosity reduction in a specified period of time, for example, by breaking long-chain molecules into shorter segments. Examples of the breakers that may be used in the drilling fluid include, but are not limited to, oxidizing agents such as sodium chlorites, sodium bromate, hypochlorites, perborate, persulfates, and peroxides, as well as enzymes. In at least one embodiment, the drilling fluid of the present disclosure is devoid of a breaker. In a preferred embodiment, the drilling fluid of the present disclosure is devoid of an oxidizer capable of generating reactive hydroxyl and oxygen radicals.

In one or more embodiments, the drilling fluid further comprises at least one additive selected from the group consisting of a defoamer, a fluid-loss control agent, a viscosifier, an antiscalant, a deflocculant, a lubricant, a clay stabilizer, a bridging agent, and a surfactant.

A defoamer helps gas escape from drilling fluids. Exemplary defoamers include, but are not limited to, glycol, silicone, sulfonated hydrocarbons, octanol, and aluminum stearate. A defoamer may also be called an anti-foam agent or a foam breaker. In one embodiment, the defoamer may be D-AIR 3000, D-AIR 3000L, D-AIR 4000L, NF-1, NF-3, NF-7, D-AIR 2, and/or D-AIR 1, available from Halliburton, or some other defoamer. In one embodiment, the defoamer is present in the drilling fluid in an amount of 0.01-0.2 lb/bbl, preferably 0.04-0.15 lb/bbl, more preferably 0.08-0.1 lb/bbl.

Fluid-loss control agents limit the loss of drilling fluids into permeable formations. In other words, fluid-loss control agents limit the amount of filtrate that permeates into a permeable formation. Fluid-loss control agents may also be called "fluid loss agents," or "filtration control additives." These include but are not limited to, starch, guar gum, carboxymethyl cellulose, crospovidone, croscarmellose sodium, sodium starch glycolate polysaccharides, polyanionic cellulose polymer, and acrylic polymers such as polyacrylamide, or a clay deflocculant. Starch includes but is not limited to corn starch, tapioca starch, and potato starch. In one embodiment, the fluid-loss control agent may be BARANEX®, DURATONE®, both available from Halliburton, or some other fluid loss control agent. In one embodiment, the fluid-loss control agent is present in an amount of 0.5-10 lb/bbl, preferably 1-8 lb/bbl, more preferably 2-5 lb/bbl.

Viscosifiers may also be called "thickeners," and are used to increase the viscosity of a drilling fluid. Exemplary viscosifiers include, but are not limited to, bauxite, bentonite, dolomite, limestone, calcite, vaterite, aragonite, magnesite, taconite, gypsum, quartz, marble, hematite, hectorite, bentonite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, xanthan gum (XC-polymer), xanthan gum, guar gum, glycol, carboxymethylcellulose, polyanionic cellulose, and the like. In one embodiment, one or more viscosifiers are present in the drilling fluid in a combined amount of 0.1-10 lb/bbl, preferably 1-8 lb/bbl, more preferably 2-4 lb/bbl. In one embodiment, the viscosifier may be GELTONE® II, available from Halliburton.

In a preferred embodiment, the liquid phase is water-based fluid, and the viscosifier comprises bentonite. Bentonite is an absorbent aluminum phyllosilicate, an impure clay consisting primarily of montmorillonite. Montmorillonite generally comprises sodium, calcium, aluminum, magnesium, and silicon, and oxides and hydrates thereof. Other compounds may also be present in the bentonite of the present disclosure, including, but not limited to, potassium-containing compounds, and iron-containing compounds. There are different types of bentonite, named for the respective dominant element, such as potassium (K), sodium (Na), calcium (Ca) and aluminum (Al). Therefore, in terms of the present disclosure "bentonite" may refer to potassium bentonite, sodium bentonite, calcium bentonite, aluminum bentonite, and mixtures thereof, depending on the relative amounts of potassium, sodium, calcium, and aluminum in the bentonite.

In a preferred embodiment, the liquid is water-based fluid, and the drilling fluid comprises both XC-polymer and bentonite as viscosifiers. Xanthan gum (XC-polymer) is a polysaccharide and biopolymer, and derives its name from the species of bacteria used during the fermentation process, *Xanthomonas campestris*. The addition of XC-polymer may cause the viscosity of a drilling fluid to decrease with higher shear rates, which behavior is called shear thinning or pseudoplasticity.

In some embodiments, certain additives may have more than one function, or may be grouped with one or more additives. For instance, XC-polymer may be considered both a viscosifier and a fluid-loss control agent.

The term "antiscalant" refers to any chemical compound that prevents, slows, minimizes, and/or stops the precipitation of scale (e.g. calcium carbonate, calcium sulfate, barium sulfate, strontium sulfate, calcium phosphate, calcium fluoride, calcium silicate, magnesium hydroxide, zinc carbonate, and the like) from an aqueous salt solution. Antiscalants which may be used in the present disclosure include, phosphine or sodium hexametaphosphate, sodium tripolyphosphate and other inorganic polyphosphates, hydroxy ethylidene diphosphonic acid, butane-tricarboxylic acid, phosphonates, or phosphonic acids such as amino tris (methylenephosphonic acid) (ATMP), etc. carboxyl group-containing starting material acids, maleic acid, acrylic acid and itaconic acid and the like, polycarboxylic acid polymers, sulfonated polymers, vinyl sulfonic acid, allyl sulfonic acid, and 3-allyloxy-2-hydroxy-propionic acid and other vinyl monomers having a sulfonic acid group, or a nonionic acrylamide monomer from the vinyl copolymer, and the like. Further, organic acids which are safe under the FDA GRAS guidelines for food production yet still effective in decomposition of carbonates found in the soils and in rock formations may be used as the antiscalant. The basic principle action of organic acids on carbonates is to cause the disassociation or the carbonate to produce the oxide and carbon dioxide. The first group of suitable organic acids is lactic, acetic, formic, fumaric, citric, oxalic, adipic and uric. The second group of suitable organic acids is the carboxylic acids, whose acidity is associated with their carboxyl group —COOH. Sulfonic acids, containing the group —$SO_2OH$, are relatively stronger acids. The relative stability of the conjugate base of the acid determines its acidity. In some biological systems more complex organic acids such as L-lactic, citric, and D-glucuronic acids are formed. These use the hydroxyl or carboxyl group. The third group of suitable organic acids is humic, sebacic, stearic, gallic, palmitic, caffeic, glyoxylic, fulvic, carnosic, anthranilic, ellagic, lipoic, chlorogenic, rosmarinic, phosphoric, methacrylic, oleanic, nitrohumic, florocinnamic, hexaflorosilicic, hydrofluoric, hydroxycitric and silicofluoric. The fourth group of suitable organic acids includes acetic, malic, citric, tartaric, oxalic, boric, and mandelic acid. The fifth group of suitable organic acids includes beta hydroxy acids which are a type of phenolic acid. Salicylic acid is a colorless crystalline organic acid, whose main active ingredient is obtained from this source, is a monohydroxybenzoic acid. An antiscalant may be present in the drilling fluid in an amount of 0.01-5 lb/bbl, preferably 0.1-2 lb/bbl, more preferably 0.5-1 lb/bbl.

A deflocculant is a chemical additive to prevent a colloid from coming out of suspension or to thin suspensions or slurries, and may be used to reduce viscosity of clay-based fluids. One type of deflocculant is an anionic polyelectrolyte, such as acrylates, polyphosphates, lignosulfonates (Lig), or tannic acid derivates such as quebracho. The drilling fluid may comprise a deflocculant in an amount of 0.01-5 lb/bbl, preferably 0.1-2 lb/bbl, more preferably 0.5-1 lb/bbl.

In one embodiment, the drilling fluid of the present disclosure comprises a lubricant in an amount of 0.01-5 lb/bbl, preferably 0.1-2 lb/bbl, more preferably 0.5-1 lb/bbl, for lubrication and additional fluid loss control. The lubricant may be a synthetic oil or a biolubricant, such as those derived from plants and animals, for example, vegetable oils. Synthetic oils include, but are not limited to, polyalphaolefin (PAO), synthetic esters, polyalkylene glycols (PAG), phosphate esters, alkylated naphthalenes (AN), silicate esters, ionic fluids, multiply alkylated cyclopentanes (MAC). Exemplary vegetable oil-based lubricants (i.e. biolubricants) that may be used in the present disclosure include canola oil, castor oil, palm oil, sunflower seed oil, and rapeseed oil from vegetable sources, and tall oil from tree sources, and the like.

In one embodiment, a clay stabilizer is present in the drilling fluid in an amount of 1-40 lb/bbl, preferably 5-30 lb/bbl, more preferably 10-20 lb/bbl. The clay stabilizer may be a halide salt such as NaCl, NaI, NaBr, KCl, KI, KBr, or some other halide salt. Preferably the clay stabilizer is NaCl, KCl, or both.

In one embodiment, a bridging agent or bridging material is present in the drilling fluid in an amount of 1-15 lb/bbl, preferably 2-10 lb/bbl, more preferably 4-8 lb/bbl. The role of the bridging agent may be to insert into the pore openings of a formation and prevent loss of drilling fluid. The bridging agent may be calcium carbonate, other suspended salts, or resins. Preferably the bridging agent is calcium carbonate ($CaCO_3$).

In one embodiment, a surfactant is present in the drilling fluid in an amount of 0.5-10 lb/bbl, preferably 1-8 lb/bbl, more preferably 4-6 lb/bbl. The surfactant may be considered an interfacial tension reducer, though it may also be present to assist with stabilization of an emulsion. The surfactant may be a nonionic surfactant, an anionic surfactant, a cationic surfactant, a gemini surfactant, a viscoelastic surfactant, or a zwitterionic surfactant. The surfactant may further provide a role as a water-wetting agent, a foamer, a detergent, a dispersant, or an emulsifier. Without limitation, illustrative surfactants suitable for use in the drilling fluid include acid hydrolyzable mixed alkyldiethanol amides, alkyl glucosides, polyalkylglucosides, alkylalkoxypolydimethylsiloxanes, polyalkyldimethylsiloxanes, fatty acids, soaps of fatty acids, amido amines, polyamides, polyamines, oleate esters, imidazoline derivatives, oxidized crude tall oil, organic phosphate esters, alkyl aromatic sulfates, alkyl aromatic sulfonates, alkyl sulfates, alkyl sulfonates, monoesters of polyalkoxylated sorbitan, polyester polyols, aliphatic alcohol esters, aromatic alcohol esters, ammonium salts of polyacrylic acid, and ammonium salts of 2-acrylamido-2-methylpropane sulfonic acid/acrylic acid copolymer. The surfactant may be used in a liquid form or in a powder form.

The drilling fluid may comprise sodium carbonate (also known as "soda ash") at a percentage of 0.1-5 lb/bbl, preferably 0.5-4 lb/bbl, more preferably 1-2 lb/bbl. The soda ash may be used to maintain calcium levels, and in alternative embodiments, other compounds may be added with or in place of the soda ash for the same purpose.

The drilling fluid may comprise a metal hydroxide for pH adjustment. The metal hydroxide may be present in an amount of 0.1-10 lb/bbl, preferably 0.5-5 lb/bbl, more preferably 1-2 lb/bbl. The metal hydroxide may be NaOH, KOH, LiOH, $Ca(OH)_2$ (i.e. lime) or some other metal hydroxide. Preferably the metal hydroxide is KOH and/or $Ca(OH)_2$.

A drilling fluid of this disclosure may optionally comprise any number of additional additives. Examples of such additional additives include, without limitation, gelling agents, corrosion inhibitors, rheology control modifiers or thinners, temporary viscosifying agents, high temperature/high pressure control additives, emulsification additives, acids, alkalinity agents, pH buffers, fluorides, gases (e.g. nitrogen, carbon dioxide), surface modifying agents, tackifying agents, foamers, catalysts, clay control agents, biocides, bactericides, friction reducers, antifoam agents, dispersants, flocculants, friction reducers, relative permeability modifiers, resins, particulate materials (e.g., proppant particulates), wetting agents, coating enhancement agents, filter cake removal agents, odorants, shale stabilizers, and the like. One or more of these additives may comprise degradable materials that are capable of undergoing irreversible degradation downhole.

In one embodiment, a total mud conditioner and shale stabilizer Soltex®, available from Chevron Phillips Chemical, may be used in the drilling fluid. In another embodiment, BlacKnite® (trademark of the Sun Drilling Products Corporation) borehole stabilization and HPHT (high-pressure high-temperature) fluid loss control product of the Sun Drilling Products Corporation may be used in the drilling fluid. In another embodiment, a corrosion inhibitor SOURSCAV® scavenger (trademark of Halliburton) that eliminates the presence of $H_2S$ is present in the drilling fluid. In another embodiment, emulsifiers INVERMUL®, and/or EZ MUL® (trademarks of Halliburton) are used in the drilling fluid.

A person of ordinary skill in the art, with the benefit of this disclosure, will recognize the types of additives that may be included in the drilling fluid for a particular application, without undue experimentation.

Thorough mixing of the liquid phase (e.g. the water-based fluid, the oil-based fluid), the weighting agent, the perlite, and the at least one additive, when present, is desirable to avoid formation of lumps or "fish eyes" in the drilling fluid. A drilling fluid mixture comprising the aforementioned components (e.g. the liquid phase, the weighting agent, the perlite, and the optional additives) may be stirred with a stirring speed of 1 to 800 rpm, or 5 to 700 rpm, or 10 to 600 rpm, to avoid formation of lumps or "fish eyes." The drilling fluid mixture may be stirred for a sufficient amount of time, for example, between 5 and 60 minutes, preferably between 10 and 45 minutes, to ensure formation of a drilling fluid that is substantially free of lumps.

In one or more embodiments, the drilling fluid of the present disclosure has a density in a range of 8-30 ppg, 10-25 ppg, or 15-20 ppg. This density may be obtained at a temperature in a range of 60-300° F., preferably 80-200° F. As defined herein, "ppg" refers to pounds-per-gallon (lb/gal). In one embodiment, the weighting agent is barite, and the drilling fluid has a density in a range of 12-25 ppg, preferably 15-22 ppg, even more preferably 18-20 ppg. In another embodiment, the weighting agent is calcite, and the drilling fluid has a density in a range of 8-15 ppg, preferably 9-13 ppg, even more preferably 10-12 ppg, or about 11 ppg.

As used herein, the term "yield point" (YP) refers to a parameter of the Bingham plastic model, where yield point refers to the yield stress extrapolated to a shear rate of zero. "Plastic viscosity" (PV) is another parameter of the Bingham plastic model, which represents the slope of the shear stress/shear rate line above the yield point.

In one or more embodiments, the drilling fluid of the present disclosure has a yield point to plastic viscosity (YP/PV) ratio in a range of 1.3:1 to 3.5:1, preferably 1.4:1 to 3:1, more preferably 1.5:1 to 1.8:1 at a temperature of 90 to 180° F., preferably 120 to 150° F. The presence of the perlite may increase the YP/PV ratio of the drilling fluid. In one embodiment, the drilling fluid has an YP/PV ratio 30-70% greater than that of a substantially similar drilling fluid devoid of perlite, preferably 35-60% greater, preferably 40-50% greater than that of a substantially similar drilling fluid devoid of perlite.

In one embodiment, the weighting agent is barite, and the drilling fluid has a yield point to plastic viscosity ratio in a range of 1.3:1 to 2.5:1, preferably 1.4:1 to 2:1, more preferably 1.5:1 to 1.8:1, or about 1.6:1. In another embodiment, the weighting agent is calcite, and the drilling fluid has a yield point to plastic viscosity ratio of 1.4:1 to 3:1, preferably 1.5:1 to 2.5:1, more preferably 1.6:1 to 2:1, or about 1.7:1.

In one or more embodiments, the drilling fluid of the present disclosure has a pH in a range of 7-12, preferably 7.5-11.5, preferably 8-11, preferably 8.5-10.5, preferably 9-10, or about 9.5. However, in certain embodiments, the drilling fluid has a pH below 7 or greater than 12. The pH of the drilling fluid may be adjusted via addition of aforementioned additives (e.g. the metal hydroxide, the buffer) according to specific drilling conditions.

According to a second aspect, the present disclosure relates to a method of drilling a subterranean geological formation. The subterranean geological formation may be a carbonate formation, a sandstone formation, a shale formation, a clay formation, or like formation. In one preferred embodiment, the subterranean geological formation is a carbonate formation, e.g. limestone or dolostone, which contains carbonate minerals, such as calcite, aragonite, dolomite, etc. In another preferred embodiment, the subterranean geological formation is a sandstone formation, for example, a formation which contains quartz, feldspar, rock fragments, mica and numerous additional mineral grains held together with silica and/or cement. In some embodiments, the subterranean geological formation is a shale formation, which contains clay minerals and quartz. In another embodiment, the subterranean geological formation is a clay formation, which contains chlorite, illite, kaolinite, montmorillonite and smectite.

A "wellbore" refers to a part of any geological formation that may contain various combinations of natural gas (i.e., primarily methane), light hydrocarbon, or non-hydrocarbon gases (including condensable and non-condensable gases), light hydrocarbon liquids, heavy hydrocarbon liquids, crude oil, rock, oil shale, bitumen, oil sands, tar, coal, and/or water. Exemplary non-condensable gases include hydrogen, helium, carbon monoxide, carbon dioxide, methane, and other light hydrocarbons.

The method involves drilling the subterranean geological formation to form a wellbore therein. The drilling fluid of the first aspect in any of its embodiments may be injected into the formation and circulated through the wellbore, often during the drilling. In some embodiments, the drilling comprises the steps of identifying a site of interest, and creating a starter hole in the ground at that site. A drill bit, which may be coupled to a hydraulic pump, may be driven through the starter hole. The drill bit and the hydraulic pump are not meant to be limiting and various types of drill bits and hydraulic pumps, as known to those of ordinary skill in the art, may be utilized here. A pumping system may be used to circulate drilling fluid in the wellbore during the drilling. The wellbore may be drilled to a depth of at least 20 m, preferably at least 100 m, preferably at least 500 m, preferably 1,000 m to 3,000 m, preferably 1,500 m to 2,500 m.

The subterranean geological formation may be drilled using different protocols, as known to those of ordinary skill in the art, to form a vertical wellbore, a horizontal wellbore, a multilateral wellbore, or a maximum reservoir contact (MRC) wellbore. As used here, a horizontal wellbore refers to a wellbore that has a vertical section and a horizontal lateral section with an inclination angle (an angle between the vertical section and the horizontal lateral section) of at least 70°, or at least 80°, or in the range of 85° to 90°. The horizontal wellbore may enhance a reservoir performance due to an increased reservoir contact provided by the horizontal lateral section. As used here, a multilateral wellbore refers to a wellbore that has a main/central borehole and a plurality of laterals extend outwardly therefrom. As used here, a maximum reservoir contact wellbore is one type of directional wellbore that provides an aggregate reservoir contact of at least 2 km, or at least 5 km, or preferably about 6 km to about 8 km, through a single or a multi-lateral configuration.

In one or more embodiments, the wellbore has a downhole temperature in a range of 10-300° C., preferably 50-200° C., preferably 80-180° C., preferably 100-150° C. In a related embodiment, the wellbore has a downhole pressure in a range of 100-2,000 psi, preferably 200-1,500 psi, preferably 400-1,000 psi, preferably 500-800 psi. In some embodiments, the temperature and/or pressure may vary significantly along the wellbore (e.g. a vertical wellbore). In view of the above-mentioned downhole temperatures, the drilling fluid may preferably operate as intended at elevated temperatures and/or pressures.

During the drilling, the drilling fluid may be circulated through the wellbore to lubricate and/or cool the drill bit and to further remove drilling cuttings. In some embodiments, the drilling fluid is circulated at a flow rate ranging from 1 to 100 L/s, 5 to 50 L/s, or 10 to 25 L/s. A location in the wellbore where the drilling fluid is circulated may vary depending on the type of the wellbore. For example, in one embodiment, the wellbore is a vertical wellbore and the drilling fluid is circulated in at least a portion of a vertical section of the wellbore, e.g. from a top surface of the wellbore to a toe. In another embodiment, the wellbore is a horizontal wellbore with a horizontal lateral section, wherein the drilling fluid is only circulated in at least a portion of the horizontal lateral section. In another embodiment, the wellbore is a multilateral wellbore with a main/central borehole and a plurality of laterals extend outwardly therefrom, wherein the drilling fluid is circulated in the main/central borehole and/or at least one of the laterals.

Duration of a drilling operation may vary from about 10 minutes to about 8 hours, preferably 20 minutes to 6 hours, preferably 30 minutes to about 4 hours. In certain embodiments, the drilling fluid is circulated within the wellbore for at least 30 minutes, preferably at least 1 hour but no more than 6 hours, preferably 2 to 4 hours, preferably 2.5 to 3.5 hours. In most embodiments, a filter cake containing the weighting agent is formed on a wall of the wellbore during the circulating.

The presence of the perlite in the drilling fluid may substantially reduce of the thickness and/or volume of the filter cake. In one embodiment, a thickness of the filter cake is 30-80% less than that of a filter cake formed by a drilling method performed in a substantially similar manner with a substantially similar drilling fluid that is devoid of perlite, preferably 35-70% less, preferably 40-65% less, preferably 50-60% less than that of a filter cake formed by a drilling method performed in a substantially similar manner with a substantially similar drilling fluid that is devoid of perlite. In a related embodiment, a volume of the filter cake is 20-60% less than that of a filter cake formed by a drilling method performed in a substantially similar manner with a substantially similar drilling fluid that is devoid of perlite, preferably 25-55% less, preferably 30-50% less, preferably 40-45% less than that of a filter cake formed by a drilling method performed in a substantially similar manner with a substantially similar drilling fluid that is devoid of perlite.

As used here, the term "porosity" refers to a total pore volume per unit volume of a filter cake. The porosity of a filter cake may be measured by various methods as known to those of ordinary skill in the art, e.g. density, neutron porosity, nuclear magnetic resonance (NMR) relaxometry, and the like. In a preferred embodiment, the porosity of the filter cake is measured by NMR relaxometry (see FIGS. 2-13).

The presence of the perlite in the drilling fluid may substantially reduce of the permeability and/or porosity of the filter cake. In a preferred embodiment, a porosity of the filter cake is 20-70% less than that of a filter cake formed by a drilling method performed in a substantially similar manner with a substantially similar drilling fluid that is devoid of perlite, preferably 30-65% less, preferably 35-60% less, preferably 40-50% less than that of a filter cake formed by a drilling method performed in a substantially similar manner with a substantially similar drilling fluid that is devoid of perlite.

The drilling fluid may be recycled and further recirculated after the circulating. In one embodiment, the drilling fluid is recycled via a filtering/sieving process. For example, after the circulating, large drill cuttings may be removed by passing the drilling fluid through one or more vibrating screens, and fine cuttings may be removed by passing the drilling fluid through centrifuges or screens with small mesh sizes. The recycled drilling fluid may be recirculated into a wellbore.

The examples below are intended to further illustrate protocols for preparing, characterizing the drilling fluid, and uses thereof, and are not intended to limit the scope of the claims.

Example 1

Drilling Fluid Composition #1

The composition of drilling fluid #1 is presented in Table 1. A real barite weighted water-based drilling fluid system (18 ppg) was used as the base fluid in this test. The new drilling fluid additive was added to this formulation with a concentration ranging from 1 lb/bbl to 5 lb/bbl.

TABLE 1

Mud Formulation Example (1)

| Name | Unit | Based Fluid Description | New drilling fluid additive Description |
|---|---|---|---|
| Water | bbl | 0.691 | 0.691 |
| Bentonite | lb | 4-6 | 4-6 |
| XC-polymer | lb | 0.5 | 0.5 |
| BARANEX | lb | 0.3 | 0.3 |
| KCl | lb | 20.0 | 20.0 |
| KOH | lb | 0.5 | 0.5 |
| NaCl | lb | 66 | 66 |
| Barite | lb | 352.0 | 352.0 |
| CaCO$_3$ medium | lb | 5.0 | 5.0 |
| Sodium sulfite | lb | 0.30 | 0.30 |
| Soltex | lb | 1.0-2.0 | 1.0-2.0 |
| BlackNite | Gal | 0.3-0.5 | 0.3-0.5 |
| SOURSCAV | lb | 2 | 2 |
| Perlite | lb | 0 | 1.0-5.0 |

Example 2

Drilling Fluid Composition #2

The composition of drilling fluid #2 is presented in Table 2. A real barite weighted water-based drilling fluid system (15 ppg) was used as the base fluid in this test. The new drilling fluid additive was added to this formulation with a concentration ranging from 1 lb/bbl to 5 lb/bbl.

TABLE 2

Mud Formulation Example (2)

| Name | Unit | Base Fluid Description | New drilling fluid additive Description |
|---|---|---|---|
| Water | bbl | 0.691 | 0.691 |
| Defoamer | lb | 0.08 | 0.08 |
| Soda ash | lb | 1.0 | 1.0 |
| Bentonite | lb | 4-6 | 4-6 |
| XC-polymer | lb | 1.0-1.5 | 1.0-1.5 |
| Starch | lb | 4-6 | 4-6 |
| KCl | lb | 20.0 | 20.0 |
| KOH | lb | 0.5 | 0.5 |
| Barite | lb | 350.0 | 350.0 |
| CaCO$_3$ medium | lb | 5.0 | 5.0 |
| Perlite | lb | 0 | 1.0-5.0 |

Example 3

Drilling Fluid Composition #3

The composition of drilling fluid #3 is presented in Table 3. A real barite weighted oil-based drilling fluid system (20 ppg) was used as the base fluid in this test. The new drilling fluid additive was added to this formulation with a concentration ranging from 1 lb/bbl to 5 lb/bbl.

TABLE 3

Mud Formulation Example (3)

| Name | Unit | Base Fluid Description | New drilling fluid additive Description |
|---|---|---|---|
| Water | bbl | 0.126 | 0.126 |
| Diesel | lb | 0.483 | 0.483 |
| Lime | lb | 3.6 | 3.6 |
| Organophllic clay | lb | 44 | 44 |
| Emulsifier | lb | 5 | 5 |
| Wetting agent | lb | 5.3 | 5.3 |
| Viscosifier | lb | 0.68 | 0.68 |
| CaCl$_2$ | lb | 14.74 | 14.74 |
| Barite | lb | 513 | 513 |
| Perlite | lb | 0 | 1-3 |

Example 4

Drilling Fluid Composition #4

The composition of drilling fluid #4 is presented in Table 4. A real calcite weighted water-based drilling fluid system (11 ppg) was used as the base fluid in this test. The new drilling fluid additive was added to this formulation with a concentration ranging from 1 lb/bbl to 3 lb/bbl.

TABLE 4

Mud Formulation Example (4)

| Name | Unit | Base Fluid Description | New drilling fluid additive Description |
|---|---|---|---|
| Water | bbl | 308 | 308 |
| Defoamer | lb | 0.08 | 0.08 |
| XC-polymer | lb | 1.5 | 1.5 |

TABLE 4-continued

Mud Formulation Example (4)

| Name | Unit | Base Fluid Description | New drilling fluid additive Description |
|---|---|---|---|
| Starch | lb | 6 | 6 |
| KC | lb | 80 | 80 |
| KOH | lb | 0.3 | 0.3 |
| Sodium Sulfide | lb | 0.25 | 0.25 |
| $CaCO_3$ (MED) | lb | 80 | 80 |
| Perlite | lb | 0 | 1-3 |

Example 5

Drilling Fluid Composition #5

The composition of drilling fluid #5 is presented in Table 5. A real calcite weighted oil-based drilling fluid system (11 ppg) was used as the base fluid in this test. The new drilling fluid additive was added to this formulation with a concentration ranging from 1 lb/bbl to 3 lb/bbl.

TABLE 5

Mud Formulation Example (5)

| Name | Unit | Base Fluid Description | New drilling fluid additive Description |
|---|---|---|---|
| Diesel oil | bbl | 0.47 | 0.47 |
| Invermul | gal | 1.5 | 1.5 |
| Lime | lb | 6.0 | 6.0 |
| Duratone | lb | 4.0 | 4.0 |
| Water | bbl | 0.29 | 0.29 |
| Geltone II | lb | 4.0 | 4.0 |
| EZ mul | gal | 0.5 | 0.5 |
| $CaCl_2$ (78%) | lb | 83.0 | 83.0 |
| $CaCO_3$ fine | lb | 53.0 | 53.0 |
| $CaCO_3$ medium | lb | 30.0 | 30.0 |
| Perlite | lb | 0 | 1-3 |

Example 6

Testing Procedures

The filter cake properties including filter cake thickness, sealing characteristics (e.g. porosity and permeability) and solids invasion profile were evaluated for the new drilling fluid system. These properties were then compared with those of the base drilling fluid. Fluid invasion profiles were characterized using a new method that is based on nuclear magnetic resonance (NMR). The volume, porosity, and pore size distribution of the deposited filter cake were estimated using this method. Similarly, the volume and particle size distribution of the invaded solids were evaluated using the NMR method. These values were obtained by comparing and subtracting the volumes/porosity distribution of the sample during three different states, namely: sample state at 100% water saturation, sample state at partial-water saturation with mud invasion and filter cake deposition, and sample state at partial-water saturation with mud invasion without filter cake deposition. Since permeability of the filter cake is a direct function of the pore size distribution of the filter cake, a decrease/increase in the filter cake pore size distribution is an indication of a decrease/increase in the filter cake permeability.

High Pressure High Temperature (HPHT) fluid loss tests were conducted to implement mud invasion and filter cake formation at a laboratory scale. These tests were conducted for comparing the new drilling fluid system containing the new additive "PA" with the drilling fluid without the new additive (i.e. the reference/base drilling fluid) regarding filter cake quality and filtration volume loss properties.

The test was performed at a temperature of 120° F. and a differential pressure of 300 psi (inlet pressure of 500 psi and an outlet pressure of 200 psi).

Example 7

Results and Discussion

Results obtained showed that adding the new agent "PA" to the barite drilling fluid reduced the filter cake thickness by 40%. On the other hand, the reduction of the filter cake formed using calcite drilling fluid containing the new agent "PA" was not as significant as that for barite mud. However, the sealing property was improved as discussed below.

Figure 1:
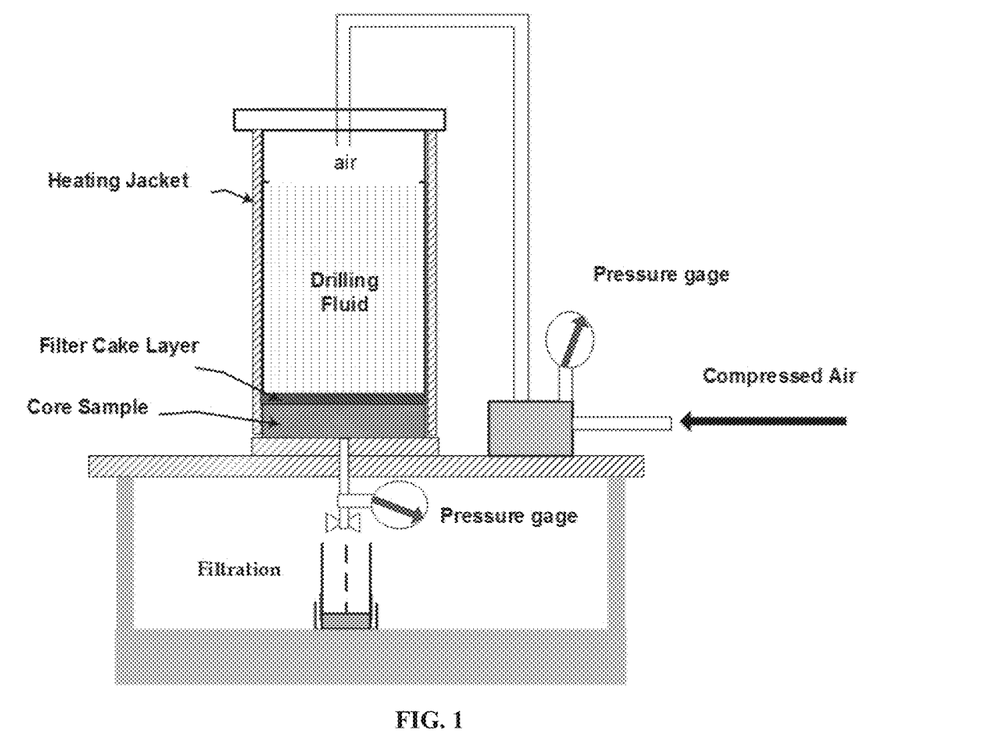
FIG. 1 is a schematic illustration of a high pressure high temperature fluid loss system for drilling fluid testing.
Figure 2:
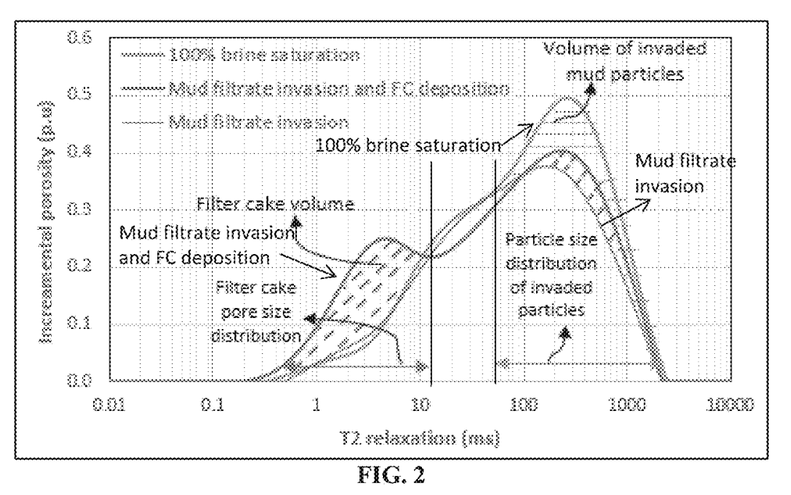
FIG. 2 shows nuclear magnetic resonance (NMR) analysis on incremental porosity of a formation core sample with barite filter cake obtained using a drilling fluid containing perlite.
Figure 3:
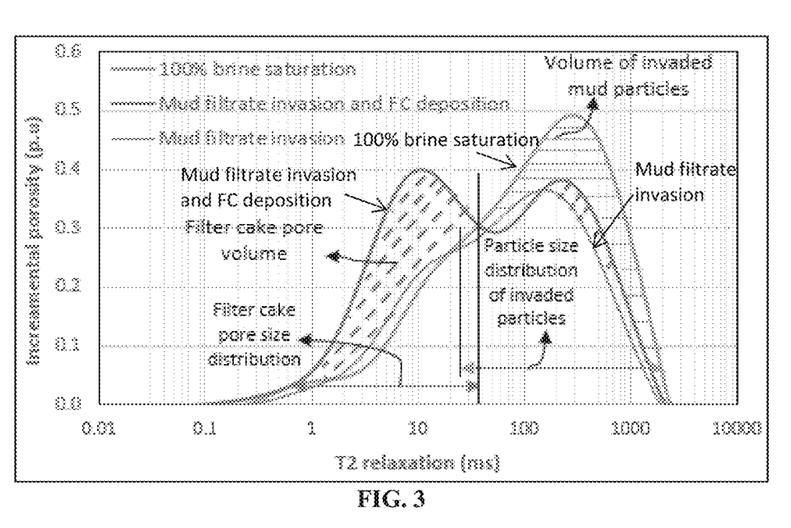
FIG. 3 shows NMR analysis on incremental porosity of a formation core sample with barite filter cake obtained using a drilling fluid that does not contain perlite.
Figure 4:
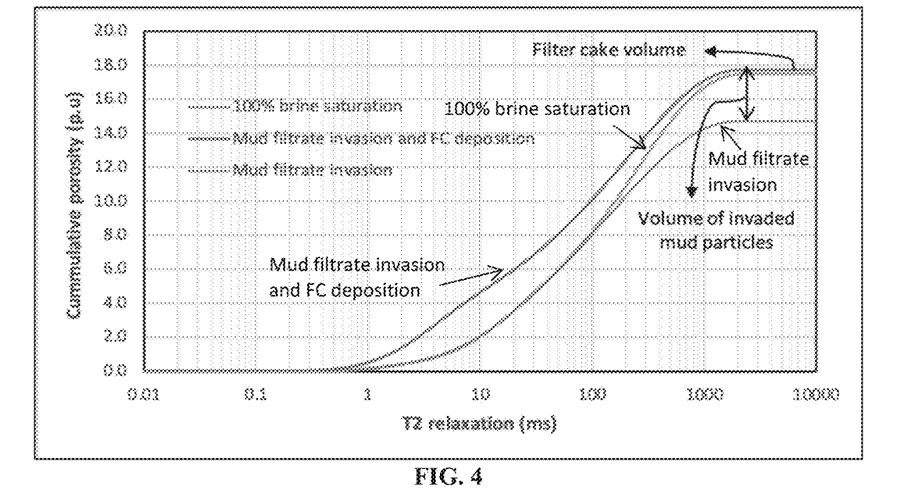
FIG. 4 shows NMR analysis on cumulative porosity of a formation core sample with barite filter cake obtained using a drilling fluid containing perlite.
Figure 5:
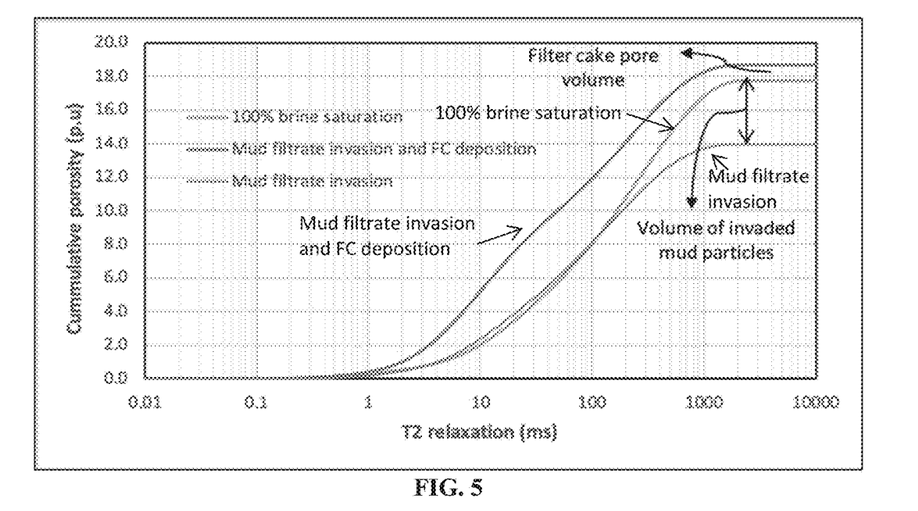
FIG. 5 shows NMR analysis on cumulative porosity of a formation core sample with barite filter cake obtained using a drilling fluid that does not contain perlite.
Figure 6:
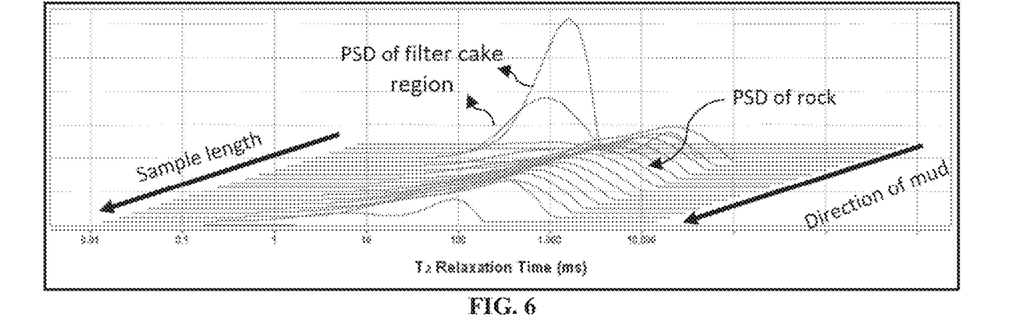
FIG. 6 shows NMR analysis on spatial distribution of a formation core sample with barite filter cake obtained using a drilling fluid containing perlite.
Figure 7:
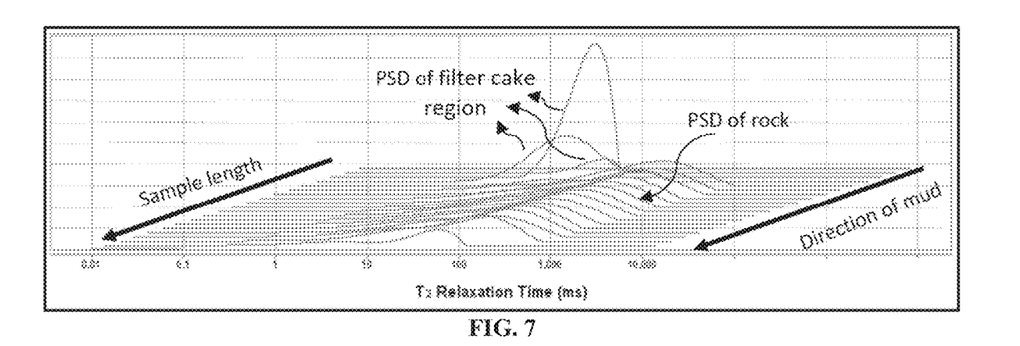
FIG. 7 shows NMR analysis on spatial distribution of a formation core sample with barite filter cake obtained using a drilling fluid that does not contain perlite.
Figure 8:
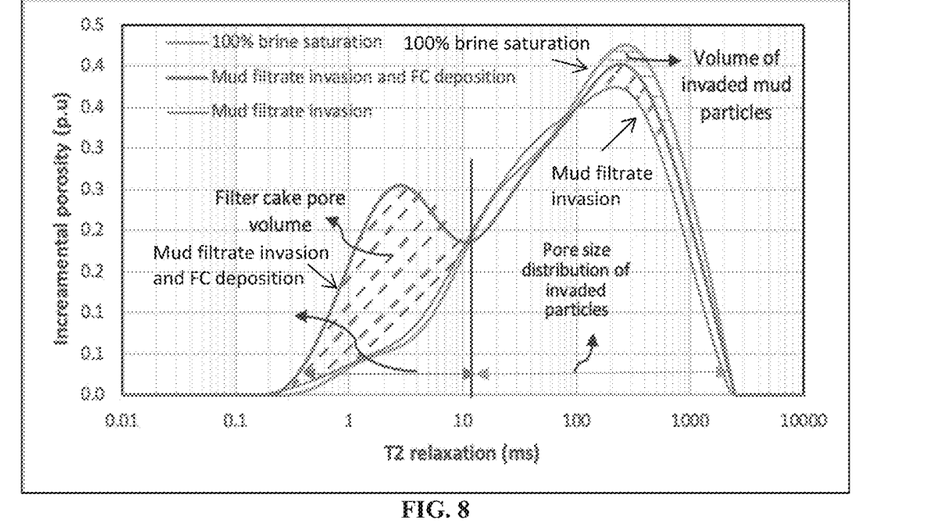
FIG. 8 shows NMR analysis on incremental porosity of a formation core sample with calcite filter cake obtained using a drilling fluid containing perlite.
Figure 9:
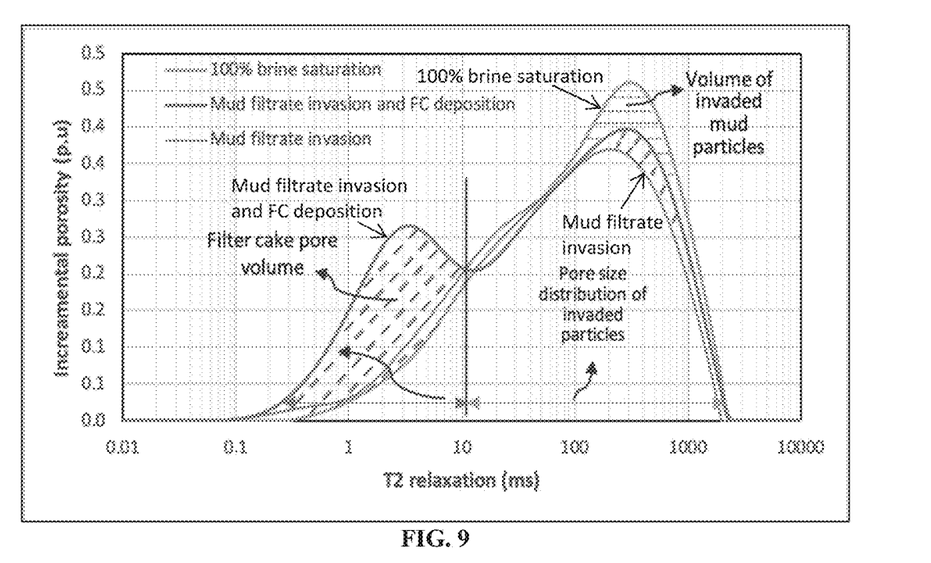
FIG. 9 shows NMR analysis on incremental porosity of a formation core sample with calcite filter cake obtained using a drilling fluid that does not contain perlite.
Figure 10:
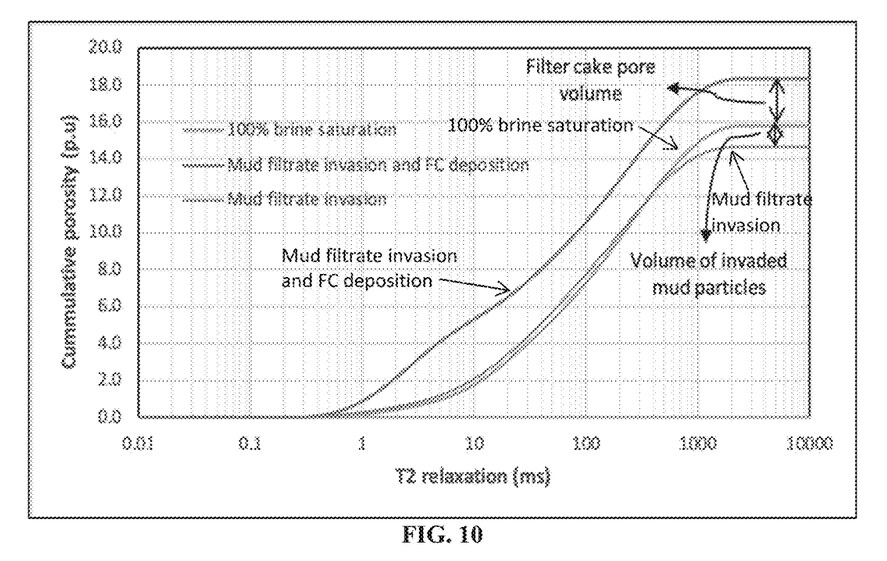
FIG. 10 shows NMR analysis on cumulative porosity of a formation core sample with calcite filter cake obtained using a drilling fluid containing perlite.
Figure 11:
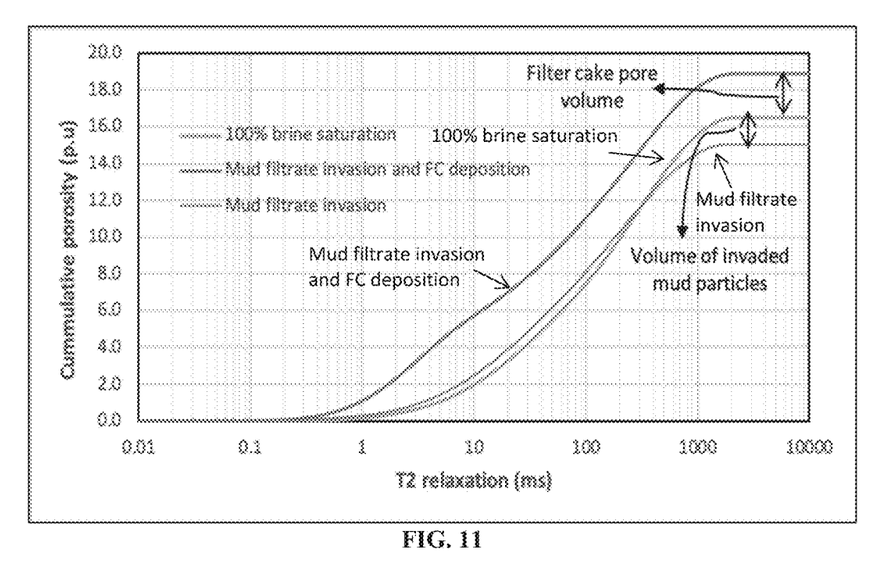
FIG. 11 shows NMR analysis on cumulative porosity of a formation core sample with calcite filter cake obtained using a drilling fluid that does not contain perlite.
Figure 12:
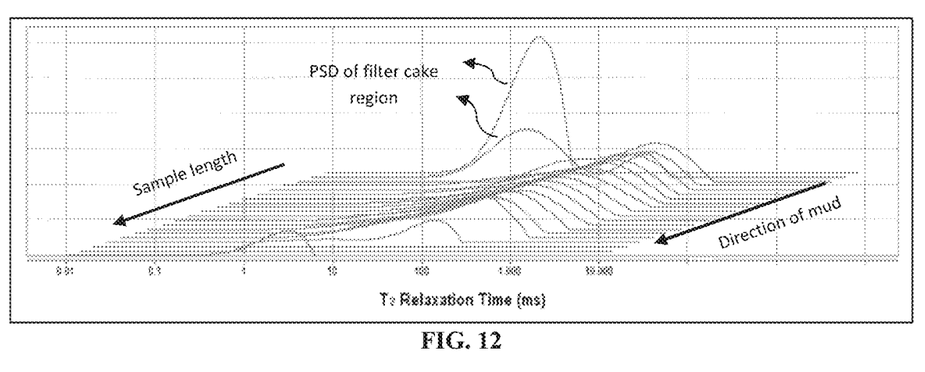
FIG. 12 shows NMR analysis on spatial distribution of a formation core sample with calcite filter cake obtained using a drilling fluid containing perlite.
Figure 13:
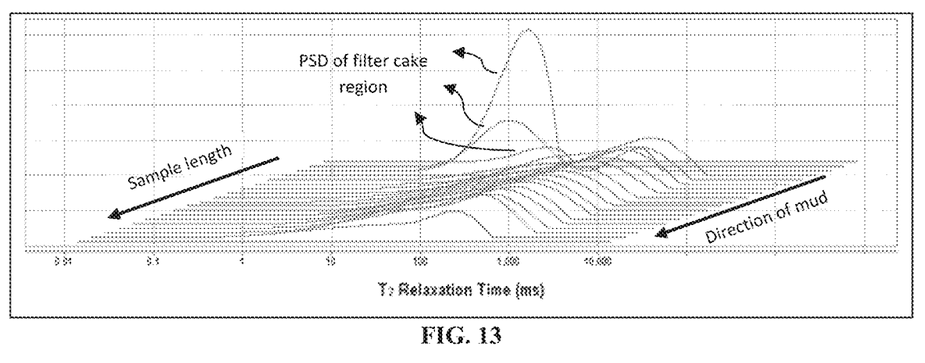
FIG. 13 shows NMR analysis on spatial distribution of a formation core sample with calcite filter cake obtained using a drilling fluid that does not contain perlite.

By adding the perlite to water barite drilling fluid, the volume of filter cake was reduced by 30-40% as clearly shown in the results of NMR measurements in FIGS. 2 and 3. On the other hand, the improvement in the filter cake volume for the water calcite drilling fluid was less significant as shown in FIGS. 8 and 9. This confirmed the results of physical measurement on the thickness of the filter cake. FIGS. 2 and 3 also demonstrated that the volume of filtration and solids invasion was reduced by 30-40% by replacing the base water barite drilling fluid with perlite containing water barite drilling fluid. Similar conclusions could be drawn for the 10-20% reduction of filtration volume and invasion solid by replacing the base water calcite drilling fluid with perlite containing water calcite drilling fluid (see FIGS. 8 and 9). This observation was also confirmed by direct measurements obtained by comparing the weights of the core sample before and after the invasion. The properties were investigated using cumulative porosity (or cumulative pore volume) analysis, as shown in FIGS. 4, 5, 10, and 11.

Further improvement including reduction on filter cake porosity and permeability by 35 to 40% was observed by adding perlite to the base barite (oil and water) drilling fluid. The calcite base (oil and water) drilling fluid cake porosity and permeability were also reduced by 20 to 25% upon addition of perlite. FIGS. 6, 7, 12, and 13 showed the spatial distribution of NMR signals along the length of the sample (with filter cake deposition in one end). The spatial distribution analysis on the barite-based drilling fluid (FIGS. 6 and 7) showed that ratio between first two peaks (representing the filter cake) to the peaks of the entire core was reduced by 35-40% after addition of the new drilling fluid additive (i.e. perlite). Furthermore, FIG. 7 (where the new additive was not present) showed that three peaks representing the filter cake area whereas only two peaks representing the filter cake were seen after adding the new additive. This observation also indicated a reduction in the thickness of filter cake layer. The spatial distribution analysis results for calcite-based drilling fluid before and after adding the additive were shown in FIGS. 12 and 13. Three peaks were observed before the new additive was added while only two peaks were found after addition of the new additive. Such reduction can be interpreted as a slight reduction in the filter cake thickness.

The improvement in the cutting carrying capacity of the new drilling fluid system was demonstrated by an improvement in yield point plastic viscosity ratio. Yp/PV ratio increased from 1.15 (base fluid) to 1.6 in average in after adding the "PA" for the barite drilling based mud. Yp/PV ratio increased from 1.2 to 1.7 in average after adding the "PA" for the calcite drilling based mud.

Example 8

Advantages

In summary, the present disclosure describes a new drilling fluid system having a novel additive "PA" which shows improved high-density drilling fluid performance for drilling deep oil and gas wells.

Drilling fluid system comprising a regular field water-based or oil-based drilling fluid composition with a high content of weighting agent such as barite and Ilmenite were used as the base fluid. The new additive "PA" was added to the base fluid with a concentration ranging from 1-5 lb/bbl. As previously described, the drilling fluid system containing a "PA" new additive (1 to 5 lb) may be used to stabilize the density distribution of the drilling fluid and minimize SAG issues.

The composition of the drilling fluid system containing the "PA" additive described herein is suitable for drilling deep oil and gas wells partially due to formation of thin filter cake layer. For example, adding the additive "PA" to barite water-base drilling fluid reduced the filter cake thickness by 40%. Accordingly, the composition including the "PA" additive would reduce drill pipe stuck challenges.

In addition, the drilling fluid system containing the "PA" additive of the present disclosure forms impermeable filter cake layer over the face of the drilled formation and therefore prevents the invasion of mud filtrate to the hydrocarbon producing formation. Accordingly, the impermeable filter cake layer greatly prevents the solids invasion. For example, adding the new additive "PA" to barite water-base drilling fluid reduced the filter cake porosity and permeability by 30-40%, and reduced the filtration volume by 25-30%.

The addition of new PA additive to the drilling fluid led to formation of ideal filter cake that can sustain formations with high differential pressure and high temperature. NMR technique was used to identify that only external filter cake layer was formed using the drilling fluid system with the PA additive. Two filter cake layers (external and internal) were formed using drilling fluid system without the new additive, which caused more significant formation damage.

In addition, the new PA additive increased the cutting carrying capacity by improving the viscosity of the mud. The additive "PA" can be used as a viscosifier for low density water-based or oil-based mud having low density weighting agents (e.g. calcite).

It is worth noting that the new additive "PA" is chemically non-reactive with different types of additives such as Bentonite, XC-polymer, pH adjustment, Clay stabilizer, and Bridging agent. For this reason, the presently disclosed drilling fluid composition may be used in different drilling systems including carbonate and sandstone reservoirs.

The invention claimed is:

1. A drilling fluid, comprising:
a water-based liquid phase; and
a solid phase, comprising:
from 0.5 to 12 lbs/bbl of expanded perlite;
from 100 to 600 lbs/bbl of the drilling fluid of particles of a weighting agent which is a combination of barite and calcite; and
from 0.1 to 10 lb/bbl of a mixture of bentonite and Xanthan gum;
wherein:
a pH of the drilling fluid is from 7 to 9.5, and
a density of the drilling fluid is from 15-30 ppg.

2. The drilling fluid of claim 1, wherein the expanded perlite is present in an amount of 1-5 lb/bbl.

3. The drilling fluid of claim 1, wherein the expanded perlite is in a form of particles having an average particle size of 0.1-6 mm.

4. The drilling fluid of claim 1, further comprising at least one additive selected from the group consisting of a defoamer, a fluid-loss control agent, a viscosifier, an antiscalant, a deflocculant, a lubricant, a clay stabilizer, a bridging agent, and a surfactant.

5. The drilling fluid of claim 1, having a yield point to plastic viscosity (YP/PV) ratio of from 1.5:1 to 3.5:1 at a temperature of from 120 to 150° F., wherein
yield point is the yield stress extrapolated to a shear rate of zero under a Bingham plastic model, and plastic viscosity is a slope of a shear stress/shear rate line above the yield point under the Bingham plastic model.

6. A method of drilling a subterranean geological formation, the method comprising:
drilling the subterranean geological formation to form a wellbore therein; and
circulating the drilling fluid of claim 1 into the wellbore during the drilling,
wherein a filter cake comprising the weighting agent is formed on a wall of the wellbore during the circulating.

7. The method of claim 6, wherein the wellbore has a temperature in a range of 10-200° C.

8. The method of claim 6, wherein the wellbore has a pressure in a range of 100-1,000 psi.

9. The method of claim 6, wherein the subterranean geological formation is a carbonate formation, or a sandstone formation.

10. The method of claim 6, wherein the wellbore is a vertical wellbore, a horizontal wellbore, or a multilateral wellbore.

* * * * *